(12) United States Patent
Solbrig et al.

(10) Patent No.: US 9,429,058 B2
(45) Date of Patent: Aug. 30, 2016

(54) MIXING DEVICES FOR SELECTIVE CATALYTIC REDUCTION SYSTEMS

(75) Inventors: Charles E. Solbrig, Ypsilanti, MI (US); Chandrashekhar Joshi, Bangalore (IN); Sherif H. El Tahry, Troy, MI (US); Venkata Subbareddy Kasa, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 1534 days.

(21) Appl. No.: 12/325,480

(22) Filed: Dec. 1, 2008

(65) Prior Publication Data

US 2010/0132345 A1 Jun. 3, 2010

(51) Int. Cl.

| | |
|---|---|
| *F01N 1/00* | (2006.01) |
| *F01N 3/20* | (2006.01) |
| *F01N 3/28* | (2006.01) |
| *B01F 5/02* | (2006.01) |
| *B01F 5/04* | (2006.01) |
| *B01F 5/06* | (2006.01) |
| *B01F 3/04* | (2006.01) |

(52) U.S. Cl.
CPC ......... *F01N 3/2066* (2013.01); *B01F 3/04049* (2013.01); *B01F 5/0268* (2013.01); *B01F 5/0473* (2013.01); *B01F 5/0616* (2013.01); *F01N 3/2892* (2013.01); *F01N 2240/20* (2013.01); *F01N 2610/1453* (2013.01); *Y02T 10/24* (2013.01)

(58) Field of Classification Search
CPC .................................................. F01N 3/2066
USPC .......................................................... 60/324
See application file for complete search history.

(56) References Cited

U.S. PATENT DOCUMENTS

| | | | |
|---|---|---|---|
| 5,489,153 A | | 2/1996 | Berner et al. |
| 6,074,619 A | * | 6/2000 | Schoubye .................. 423/239.1 |
| 6,401,449 B1 | * | 6/2002 | Hofmann et al. .............. 60/274 |
| 6,401,455 B1 | * | 6/2002 | Mathes et al. .................. 60/286 |
| 2002/0116916 A1 | * | 8/2002 | Hofmann et al. .............. 60/282 |
| 2006/0191254 A1 | * | 8/2006 | Bui ........................ F01N 3/101 60/286 |
| 2007/0036694 A1 | * | 2/2007 | Nishioka et al. ............. 422/168 |
| 2007/0204751 A1 | * | 9/2007 | Wirth et al. .................. 96/290 |
| 2007/0245718 A1 | * | 10/2007 | Cheng et al. .................. 60/286 |

FOREIGN PATENT DOCUMENTS

| | | |
|---|---|---|
| CN | 101029590 | 9/2007 |
| DE | 4123161 A1 | 1/1993 |
| DE | 4313393 A1 | 10/1994 |
| DE | 19741199 A1 | 4/1999 |
| DE | 102007002981 A1 | 7/2008 |
| DE | 102007020812 A1 | 11/2008 |
| EP | 1748162 A1 | 1/2007 |

* cited by examiner

*Primary Examiner* — Jason Shanske

(57) ABSTRACT

A selective catalytic reduction (SCR) system includes an exhaust pipe for receiving an exhaust gas from an engine. A selective catalytic reduction (SCR) unit is provided downstream of the exhaust pipe. A first mixing element including a meshed body defines a first surface, a second surface, and a plurality of openings extending from the first surface to the second surface. The first surface and second surface are parallel to each other and define an angle relative to a flow direction of the exhaust flow. The angle is less than 90 degrees.

10 Claims, 13 Drawing Sheets

MIXING DEVICES FOR SELECTIVE CATALYTIC REDUCTION SYSTEMS

FIELD

The present disclosure relates to selective catalytic reduction (SCR) systems for exhaust systems of motor vehicles, and more particularly to mixing devices for the SCR systems to mix a reductant (e.g., urea) and an exhaust prior to reaching a SCR catalyst.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Selective catalytic reduction (SCR) systems have been used in motor vehicles for nitrogen oxides ($NO_x$) reduction. The SCR system includes an SCR unit (e.g., a SCR catalyst) in which an SCR process occurs. Generally, a liquid reducing agent, such as urea, is injected into the exhaust stream upstream of the SCR unit. The injected urea solution breaks down under thermal decomposition and hydrolysis to form gaseous ammonia ($NH_3$) and carbon dioxide ($CO_2$). The gaseous ammonia functions as the reductant to react with nitrogen oxides ($NO_x$) of the exhaust gas in the SCR unit to form water ($H_2O$) and nitrogen ($N_2$). To achieve optimum SCR performance, the urea solution needs to be properly vaporized, mixed and distributed uniformly in the exhaust gas stream, before reaching the SCR unit.

Referring now to FIGS. 1 and 2, a traditional mixing device 10 of an SCR system is generally installed in an exhaust pipe 12 upstream of the SCR unit (not shown) and has a mesh structure defining a plurality of openings 14. The mixing device 10 is arranged perpendicular to the exhaust pipe 12 so that the plurality of openings 14 are parallel to a general flow direction A of the exhaust gas. Tabs 15 often extend at the downstream end of the mixing device 10 at various angles to enhance the mixing. These tabs 15 contribute to the pressure loss in the SCR system. The urea solution is injected upstream of the mixing device 10 in direction B at an angle relative to the general flow direction A of the exhaust gas. As the urea solution and the exhaust gas flow through the openings 14 and past tabs 15 of the mixing device 10, the mixing device 10 helps vaporize the urea solution and mix the urea solution with the exhaust gas.

The urea solution may pass through the openings 14 and tabs 15 without contacting the mixing device 10 and may also impinge on the pipe wall. As a result, the urea droplets may not be properly broken down into smaller sizes to be more uniformly distributed in the exhaust gas stream. Moreover, the mixing device 10 may cause a significant pressure drop across the mixing device 10, particularly at high flow rates, and impede the exhaust flow in the exhaust pipe 12.

SUMMARY

A selective catalytic reduction (SCR) system includes an exhaust pipe for receiving an exhaust gas from an engine. A selective catalytic reduction (SCR) unit is provided downstream of the exhaust pipe. A first mixing element includes a meshed body that has a first surface, a second surface, and a plurality of openings extending from the first surface to the second surface. The first surface and the second surface are parallel to each other and define an angle relative to a flow direction of the exhaust gas. The angle is less than 90 degrees.

In other features, the angle may be between 0 and 60 degrees. The angle may be zero degree and the first surface and the second surface are parallel to the flow direction of the exhaust gas to lower pressure drop. The mixing device of the present disclosure can achieve better vaporization and distribution performance without causing a significant pressure drop across the mixing device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 11:
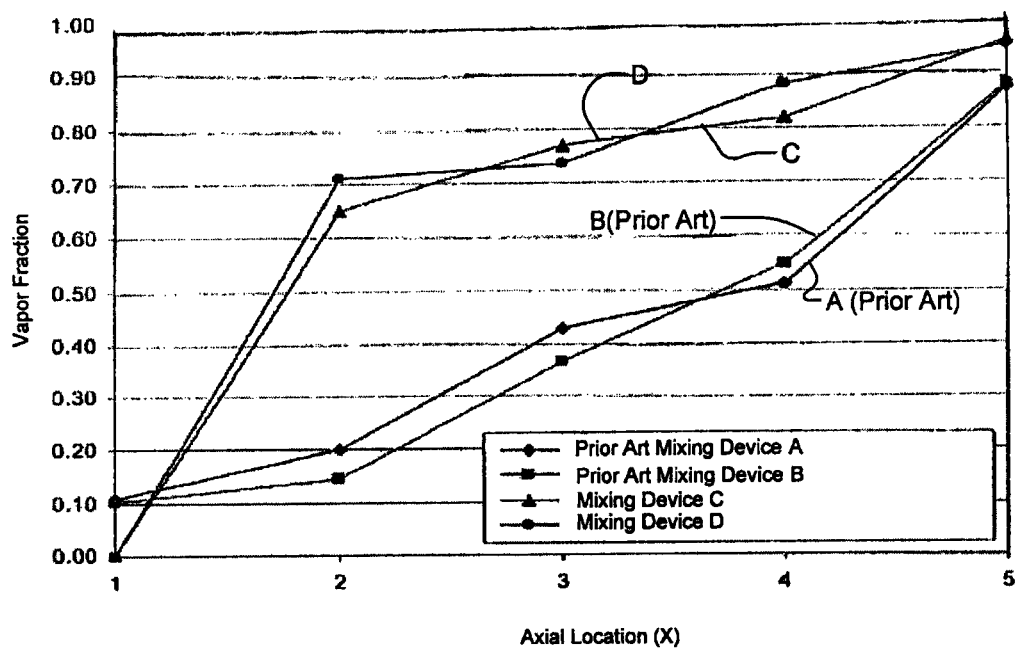
Figure 12:
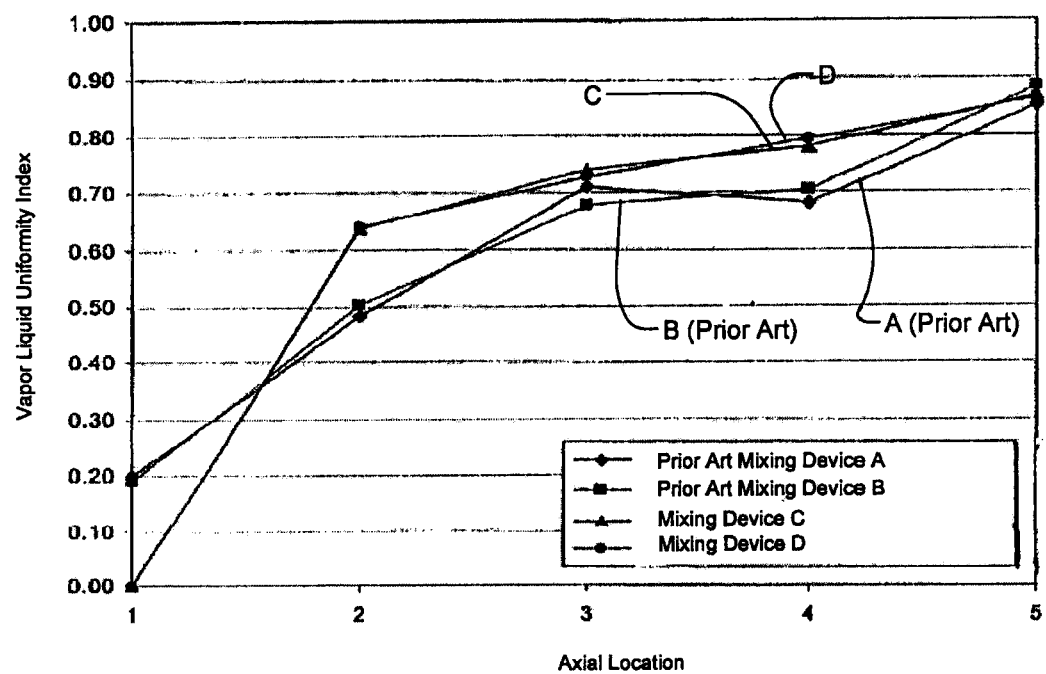
Figure 13:
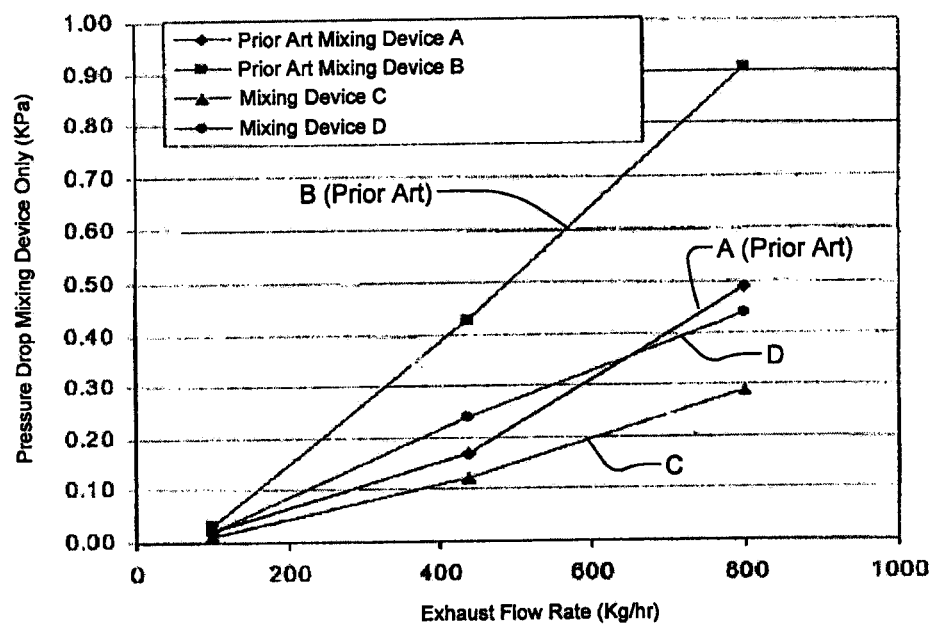

FIGS. 10A, 10B, 10C, and 10D are schematic diagrams of mixing devices A, B, C and D, respectively, illustrating their arrangement relative to the exhaust pipe;

FIG. 11 shows graphs representative of vapor fraction of a urea solution along axial locations of a mixing zone of the exhaust pipe;

FIG. 12 shows graphs representative of vapor+liquid uniformity index of a urea solution along axial locations (X) of a mixing zone of an exhaust pipe; and FIG. 13 shows graphs representative of pressure drop across mixing devices A, B, C, and D.

DETAILED DESCRIPTION

The following description is merely exemplary in nature and is not intended to limit the present disclosure, application, or uses. It should be understood that throughout the drawings, corresponding reference numerals indicate like or corresponding parts and features.

A mixing device for a selective catalytic reduction (SCR) system is provided in an exhaust pipe and upstream of an SCR unit for mixing a urea solution and an exhaust gas. The mixing device may include a meshed body and a plurality of tabs extending outwardly from the meshed body. The meshed body includes a first surface and a second surface and a plurality of openings extending from the first surface to the second surface. The first surface and the second surface are parallel to each other and define an angle relative to a wall of the exhaust pipe. The angle is less than 90 degrees. The angle may be zero degree to lower pressure drop. The mixing device of the present disclosure can achieve better vaporization and distribution performance without causing a significant pressure drop across the mixing device.

Figure 3:
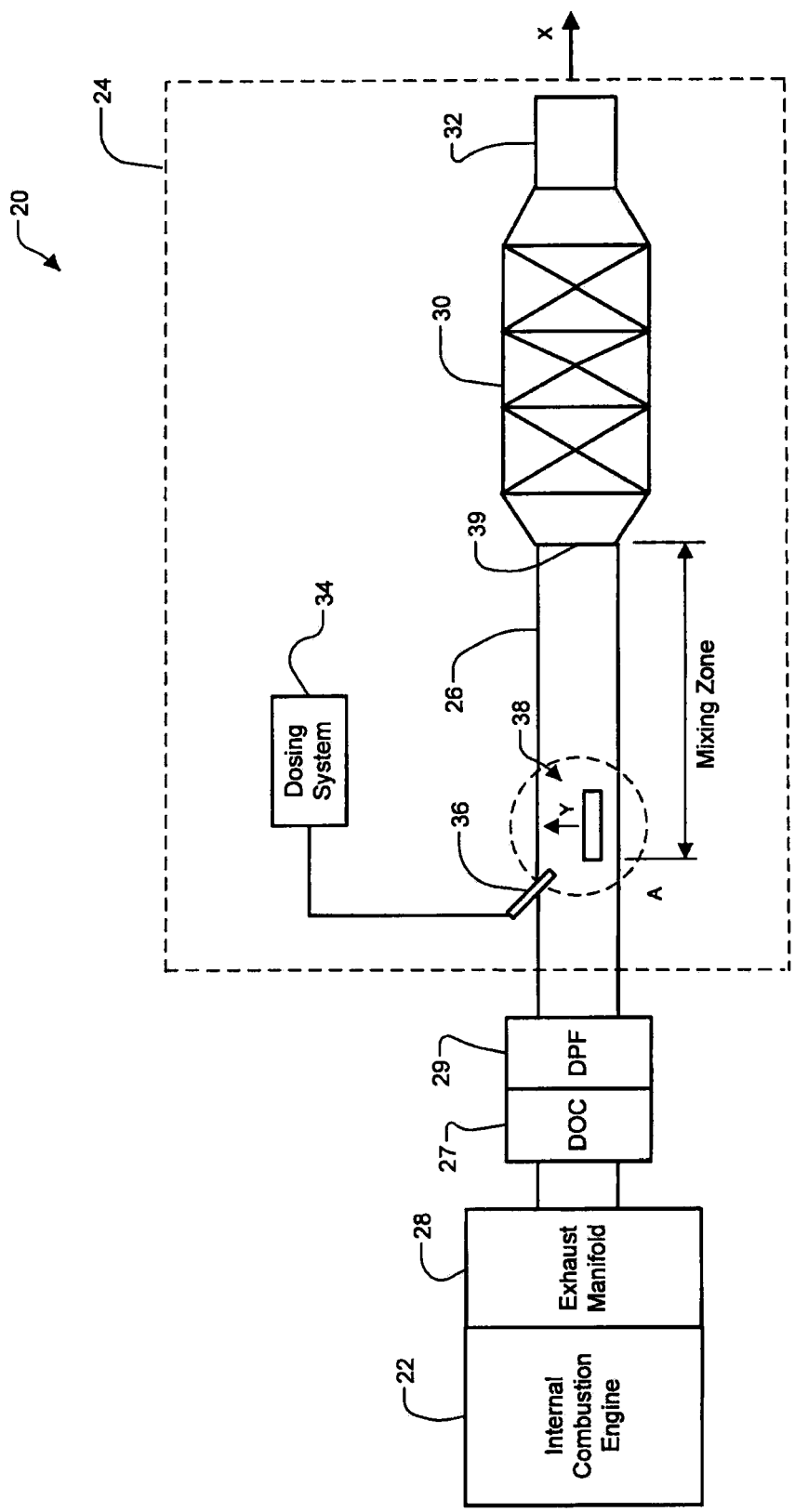
FIG. 3 is a schematic diagram of an engine system employing a mixing device of the present disclosure.

Referring to FIG. 3, an engine system 20 includes an internal combustion engine 22 and a selective catalytic reduction (SCR) system 24 for receiving and treating an exhaust gas generated in the engine 22 during the combustion process. The SCR system 24 includes an exhaust pipe 26 communicating with an exhaust manifold 28, an SCR unit 30 disposed downstream of the exhaust pipe 26, a tailpipe 32 disposed downstream of the SCR unit 30 for releasing treated exhaust gas into atmosphere, and a dosing system 34. The engine system 20 may optionally include a diesel oxidation catalyst (DOC) 27 and/or a diesel particulate filter (DPF) 29 downstream of the exhaust manifold 28. The dosing system 34 stores a urea solution required for an SCR process. An injection nozzle 36 that communicates with the dosing system 34 is provided at the exhaust pipe 26 for injecting the urea solution into the exhaust gas stream at an appropriate time. A mixing device 38 is disposed in the exhaust pipe 26 adjacent to the injection nozzle 36 for vaporizing the aqueous urea solution and mixing the vaporized urea with the exhaust gas. A mixing zone is defined between the injection nozzle 36 and an inlet 39 of the SCR unit 30.

When the SCR unit 30 reaches a predetermined temperature at which temperature the catalyst on the SCR unit 30 becomes active, the injection nozzle 36 injects an aqueous urea solution into the exhaust pipe 26. The heat of the exhaust gas stream heats and vaporizes the aqueous urea solution so that the aqueous solution is decomposed into ammonia ($NH_3$) and isocyanic acid (HNCO). The ammonia and isocyanic acid are then mixed with the exhaust gas in the exhaust pipe 26. With the mixing device 38, the urea solution is vaporized, mixed and distributed in the exhaust gas stream. The mixture of ammonia, isocyanic acid, and the exhaust gas then flows to the SCR unit 30 where an SCR process occurs. Through the SCR process, the nitrogen oxides ($NO_x$) may be removed from the exhaust gas. The treated exhaust gas is then released to atmosphere through the tailpipe 32.

Figure 4A:
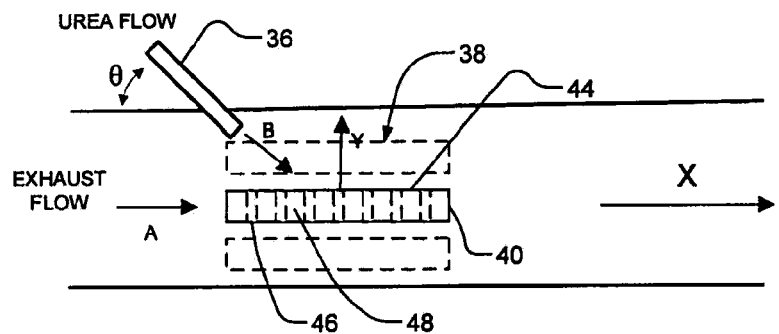
FIG. 4A is an enlarged view of portion A of FIG. 3.
Figure 4B:
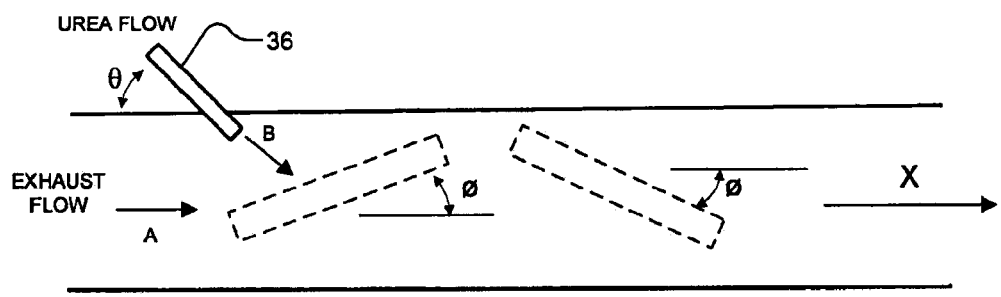
FIG. 4B is a view illustrating a mixing device in a position that forms an angle relative to a flow direction A of the exhaust gas.
Figure 5:
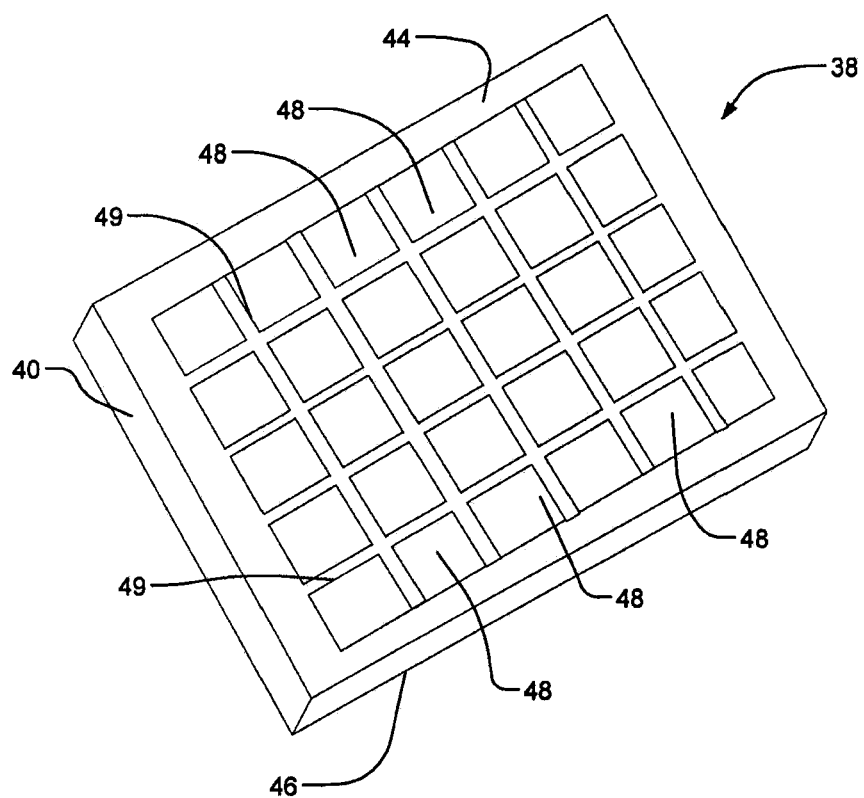
FIG. 5 is a partial schematic perspective view of a mixing device according to a first embodiment of the present disclosure.

Referring to FIGS. 4A, 4B, and 5, the mixing device 38 includes a meshed body 40 defining a Y direction The Y direction is parallel to the thickness direction of the meshed body 40 and is substantially perpendicular to the central axis (or longitudinal axis) X of the exhaust pipe 26. The meshed body 40 has a plate-like configuration and includes a first surface 44 and a second surface 46. The first surface 44 and the second surface 46 are parallel. As shown in FIG. 4B, the meshed body 40 (and hence the first and second surfaces 44 and 46) may form an angle $\phi$ relative to the general flow direction A. The angle $\phi$ is less than 90 degrees. The angle may be between 0 and 60 degrees. In one implementation, the angle $\phi$ may be less than 10° to reduce pressure drop. In other implementations, the angle $\phi$ may be greater than 10°, but less than 90°, depending on the structure of the mixing device 38.

The general flow direction A of the exhaust gas is the moving direction of an exhaust mass flow that moves from a first point to a second point. The general flow direction A of the exhaust gas is parallel to the central axis X of the exhaust pipe through which the exhaust gas flows. When the exhaust pipe 26 has a bent or curved configuration, the general flow direction A may change with the bent or curved sections of the exhaust pipe. Nonetheless, the general flow direction A of the exhaust gas is still parallel to the central axis X of the bent or curved exhaust pipe.

The plurality of openings 48 extend from the first surface 44 (the top surface) to the second surface 46 (the bottom surface) along the Y direction. A plurality of webs 49 are formed between adjacent openings 48. The first surface 44 is provided adjacent to the injection nozzle 36 so that when the urea solution is injected, the urea solution may "impinge" on the first surface 44 and flow through the openings 48 to the second surface 46. The first surface 44 functions as an impingement surface. The openings 48 are designed to allow a predetermined amount of reductant to flow below the meshed body 40 to allow better distribution. The urea solution may be injected toward the mixing device 38 in a direction B at an angle θ relative to the general flow direction A so that an impingement force may be applied to the mixing device 38. The impingement force helps the urea solution break down into smaller droplets. The droplets may progress down to the mixing device 38 and may be vaporized and mixed with the exhaust gas by the mixing device 38.

As shown in FIG. 4A, the meshed body 40 may be moved closer or away from the injector 36 along the Y direction as shown in dashed lines depending on the structure of the mixing device 38. The location (i.e., Y location) of the meshed body 40 relative to the upper wall or bottom wall of the exhaust pipe 26 may affect mixing and distribution of urea in the exhaust gas. Generally speaking, when the meshed body 40 is too close to the injector 36, the meshed body 40 may have a stratifying effect on urea, resulting in urea staying on the upper wall of the exhaust pipe 26. Depending on the size of the openings 48 and tabs 52 (shown in FIG. 6), moving the meshed body 40 closer to the injector may improve vaporization, mixing and distribution of the urea in some situations, which will be described later. For example only, when the meshed body 40 has larger openings 48 and smaller webs 49, the meshed body 40 may be moved closer to the injector 36 along the Y direction because the urea can easily flow to the bottom of the meshed body 40.

The openings 48 can have shapes other than the square shape shown in FIG. 5. For example only, the openings 48 may have circular or hexagon shape. Further, the shape and size of openings 48 may vary in the same meshed body 40 and the thickness of the webs 49 may be different. The meshed body 40 should have a small thickness to lower the pressure drop. The thinner the meshed body 40, the lower the pressure drop.

The mixing device 38 will be heated by the exhaust gas to a higher temperature than that of the exhaust pipe 26 because of less heat transfer to further improve vaporization of the urea solution.

Figure 6:
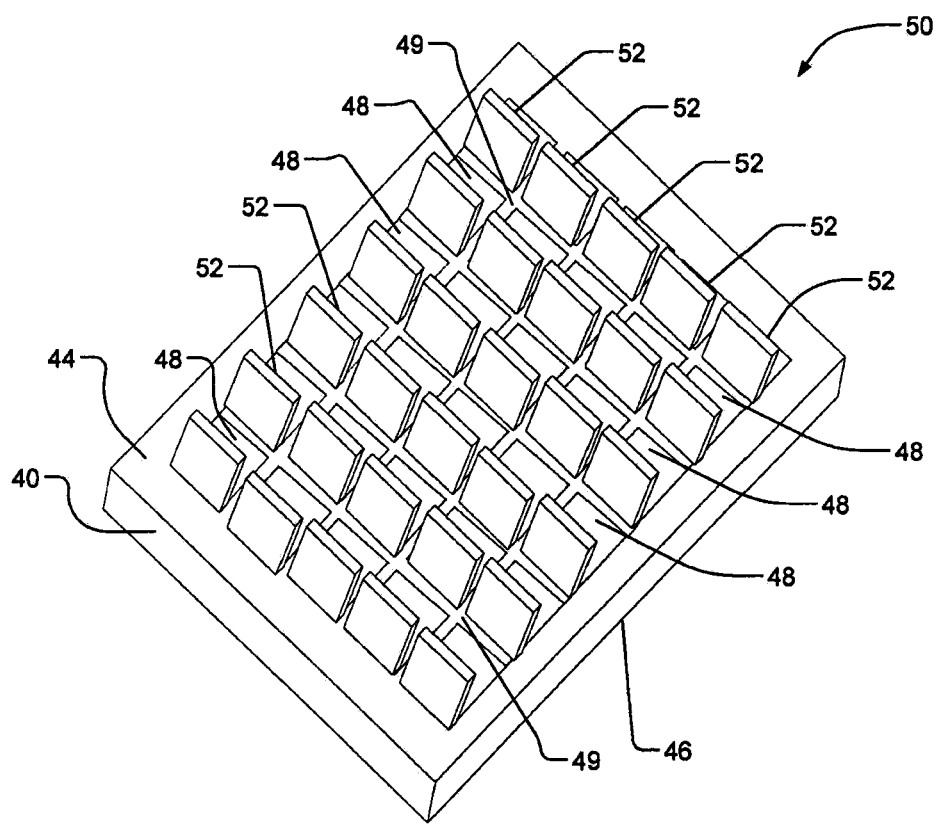
FIG. 6 is a partial schematic perspective view of a mixing device according to a second embodiment of the present disclosure.
Figure 7:
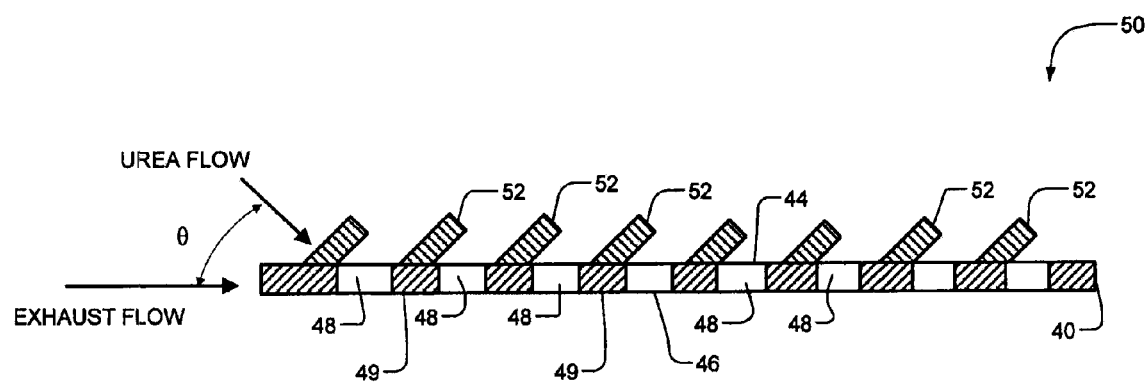
FIG. 7 is a cross-sectional view of the mixing device of FIG. 6.

As shown in FIGS. 6 and 7, a mixing device 50 according to a second embodiment of the present disclosure is similar to the mixing device 38 of the first embodiment except that the mixing device 50 includes a plurality of tabs 52 extending outwardly from the first surface 44 at an angle relative to the first surface 44. The tabs 52 may be spaced evenly along the openings 48. The tabs 52 may be formed by punching the openings 48 in a plate that forms the meshed body 40 and by bending the stamped material out of the openings 48. The plate may be a sheet metal. The angle of the tabs 52 relative to the meshed body 40 may vary.

The tabs 52 increase the overall contact surface of the mixing device 50 so that the urea solution can be more easily broken down into smaller droplets through impingement of the urea onto the tabs 52. The urea solution may be injected in a direction perpendicular to the tabs 52 so that the urea solution can directly "impinge" on the tabs 52. Because the tabs 52 protrude in the exhaust gas stream at an angle relative to the general flow direction A of the exhaust gas, a turbulent flow can be generated adjacent to the tabs 52 to further improve vaporization and distribution of the urea droplets in the exhaust gas. Moreover, because the tabs 52 extend outwardly from the meshed body 40 and are small in length toward the general flow direction, the tabs 52 do not cause too much pressure drop while improving the mixing performance.

Figure 8A:
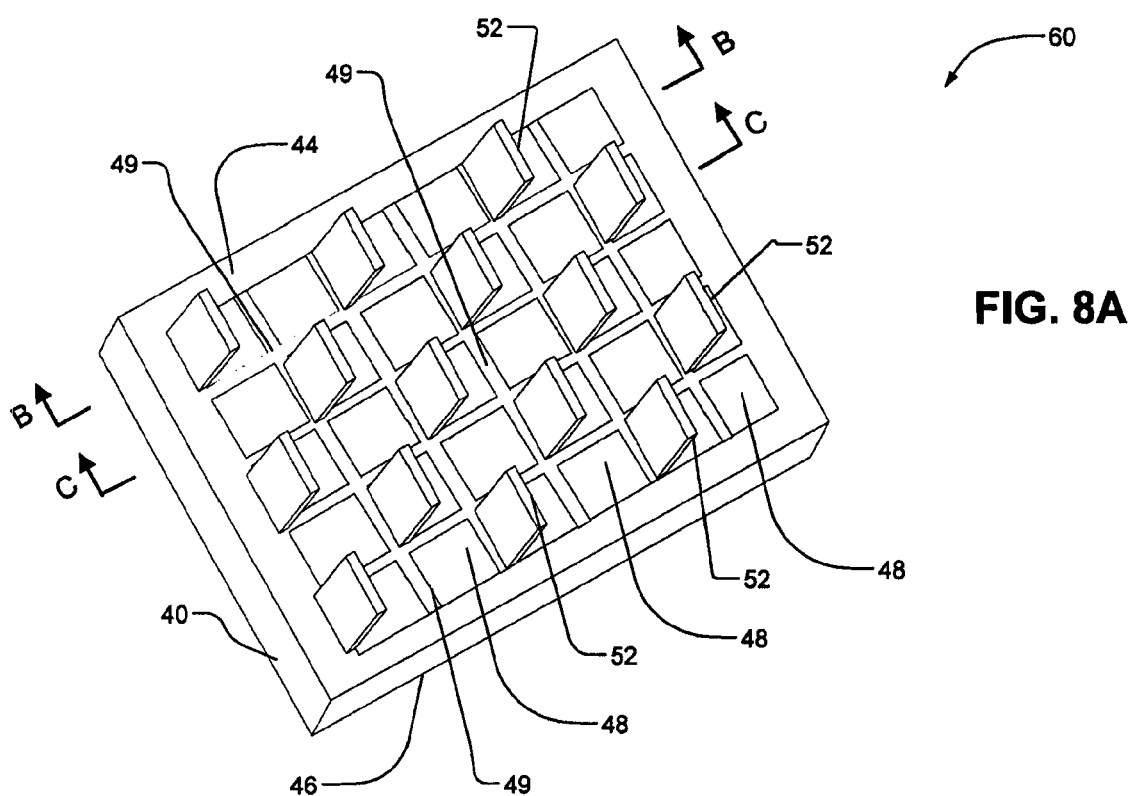
FIG. 8A is a partial schematic perspective view of a mixing device according to a third embodiment of the present disclosure.

As shown in FIG. 8A, a mixing device 60 according to a third embodiment of the present disclosure is similar to the mixing device 50 of the second embodiment, differing only in the arrangement of the tabs 52. The tabs 52 of the mixing device 60 are arranged alternately at every other opening 48. In this embodiment, the tabs 52 are fewer than the openings 48. The mixing device 50 may be moved closer to the injector 36 along the Y direction for an optimum mixing, vaporization, and distribution of urea.

Figure 8B:
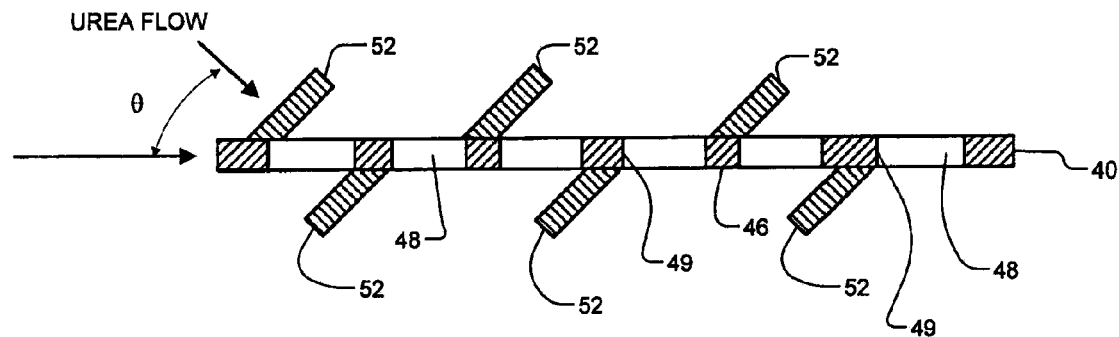
FIG. 8B is a cross-sectional view of a variant of the third embodiment.
Figure 8C:
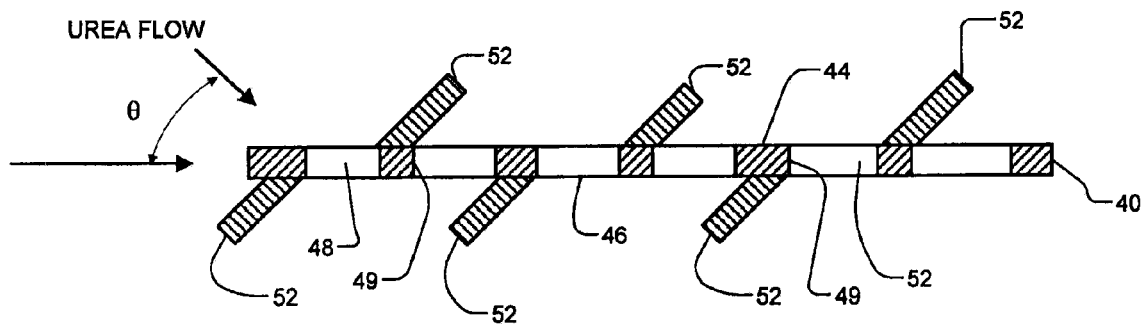
FIG. 8C is another cross-sectional view of a variant of the third embodiment.

Referring to FIGS. 8B and 8C, a mixing device according to a variant of a third embodiment is similar to the mixing device 60 of FIG. 8A, differing only in the arrangement of tabs. This variant of mixing device has a top perspective view similar to FIG. 8A. Therefore, the same FIG. 8A is used for this variant for clarity. FIG. 8B shows a cross section when taken along line B-B of FIG. 8A. FIG. 8C shows a cross section when taken along line C-C of FIG. 8A. In this variant, a plurality of tabs 52 are provided on both the first surface 44 and the second surface 46 to further increase the contact surface of the mixing device 60 and also to allow more liquid to pass below the meshed body 40. This variant includes a plurality of upper tabs that extend upwardly from the first (top) surface 44 and a plurality of lower tabs that extend downwardly from the second (bottom) surface 46. The upper tabs and the lower tabs extend in opposite directions from the meshed body 40. The lower tabs may be arranged to face adjacent ones of the upper tabs to catch spray that passes through the meshed body 40.

Figure 9:
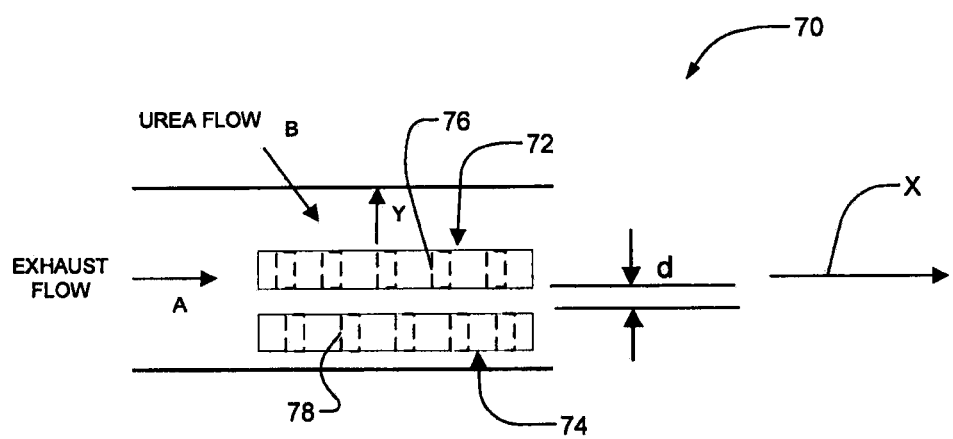
FIG. 9 is a schematic side view of a mixing device according to a fourth embodiment of the present disclosure.

Referring to FIG. 9, a mixing device 70 may include a first mixing element 72 and a second mixing element 74. The second mixing element 74 is spaced apart from the first mixing element 72 by a distance along the thickness direction Y. The thickness direction Y is substantially perpendicular to the longitudinal axis X of the exhaust pipe 26. The first mixing element 72 and the second mixing element 74 may have a structure similar to any of those described in connection with FIGS. 5 through 8. While not shown in the drawings, the mixing device 70 may have three or more mixing elements.

More specifically, the first mixing element 72 and the second mixing element 74 each define a first surface, a second surface, and a plurality of openings extending therebetween. The first surfaces and the second surfaces of the first and the second mixing elements 72 and 74 are parallel and extend in a direction substantially parallel to the general flow direction A of the exhaust pipe. The first mixing element 72 and the second mixing element 74 may have the same or different structure. The first mixing element 72 may have a plurality of first openings 76 and the second mixing element 74 may have a plurality of second openings 78. The first openings 76 and the second openings 78 may have the same or different dimensions and may be aligned or offset.

Figure 1:
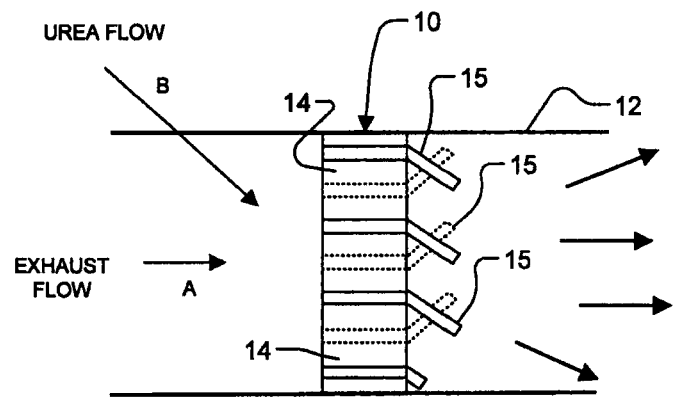
FIG. 1 is a schematic side view of a prior art mixing device installed in an exhaust pipe.
Figure 2:
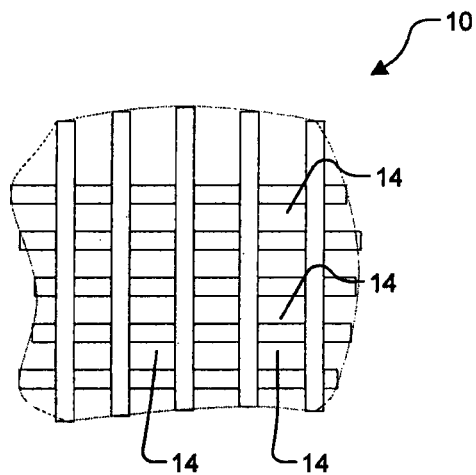
FIG. 2 is a partial cross-sectional view of a prior art mixing device.
Figure 10A:
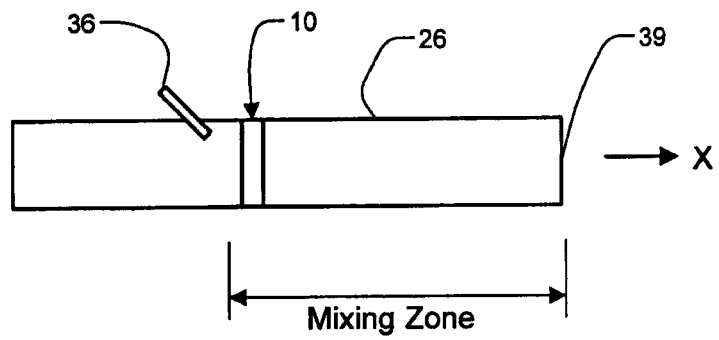
Figure 10B:
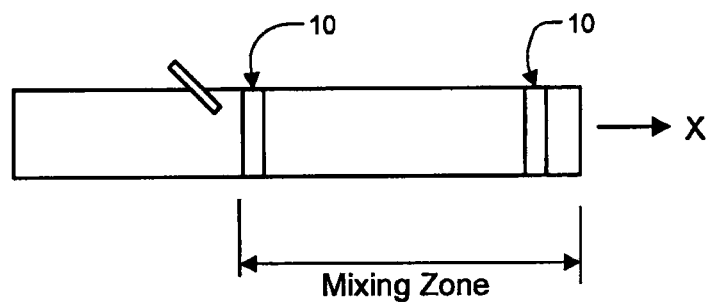
Figure 10C:
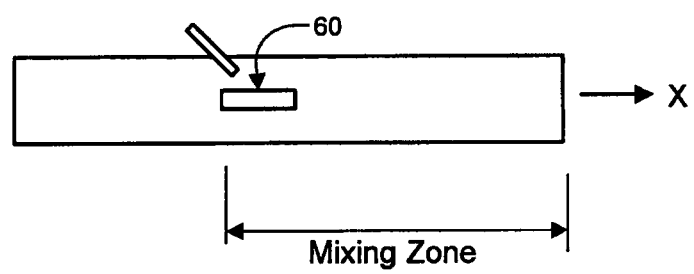
Figure 10D:
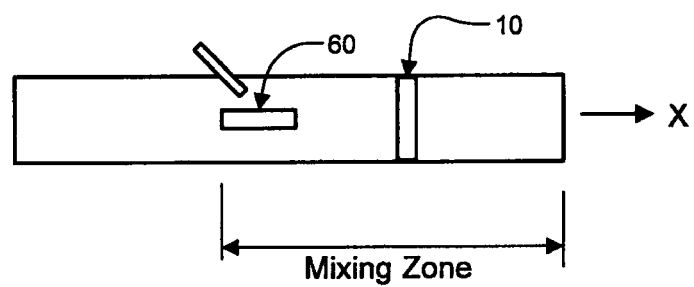

FIGS. 10A, 10B, 10C and 10D show mixing devices A, B, C and D, whose anticipated performance is compared in FIGS. 11, 12 and 13. FIG. 10A shows a mixing device A including a prior art mixing device 10 of FIGS. 1 and 2. FIG. 10B shows a mixing device B including two prior art mixing devices 10 of FIGS. 1 and 2 wherein the mixing devices 10 are spaced apart along the longitudinal axis X of the exhaust pipe 26 and one of the mixing devices 10 is provided adjacent to the inlet 39 of the SCR unit 30. The distance between the two mixing devices 10 can be adjusted by moving the mixing device 10 adjacent to the SCR unit 30 along the longitudinal axis X. FIG. 10C shows a mixing device C including a mixing device 60 according to the present disclosure as shown in FIG. 8A. FIG. 10D shows a mixing device D including a first mixing device 60 according to the present disclosure as shown in FIG. 8A and a second mixing device 10 of FIGS. 1 and 2. The distance between the first mixing device 60 and the second mixing device 10 can be adjusted by moving the second mixing device 10 along the longitudinal axis X. It is noted that the first mixing device in FIGS. 10C and 10D can be any mixing device described in FIGS. 5 to 8A with or without tabs 52.

FIGS. 11, 12 and 13 are graphs representative of anticipated performance of mixing devices A, B, C, D in terms of vaporization, mixing, and pressure drop. The flow rate of the exhaust gas in FIGS. 11 and 12 is 800 kg/hr. This is merely one example showing the benefits of the mixing devices of the present disclosure. The exhaust gas can have a flow rate different than 800 kg/hr to achieve the similar results. The abscissa (x-coordinate) represents the axial location of the mixing zone. Location 1 indicates the start of the mixing zone that is adjacent to the injection nozzle. Location 5 indicates the end of the mixing zone (the inlet 39 of the SCR unit 30).

FIG. 11 shows that mixing devices C and D, which employ a mixing device 60 of the present disclosure, reach a higher vapor fraction at location 5 (i.e., the inlet 39 of the SCR unit 30). In other words, the urea solution is better vaporized by the mixing devices C and D before entering the SCR unit 30 for the SCR process. Further, using the mixing devices C and D, a higher vapor fraction can be achieved at location 2 as soon as the urea solution passes the mixing device 60 according to the present disclosure. Therefore, mixing devices C and D that employ a mixing device 60 of the present disclosure can more quickly achieve a higher vapor fraction without a long mixing zone. This is particularly beneficial for an SCR system having a small exhaust pipe and a small mixing zone.

FIG. 12 shows the vapor-liquid uniformity index along the axial locations of the exhaust pipe 26. The vapor-liquid uniformity index represents the urea distribution in the exhaust gas. The higher the index, the better the urea distribution in the exhaust gas. Mixing devices C and D are shown to have a higher index at location 2 (i.e., the outlet of the mixing device 60). Therefore, mixing devices C and D can more quickly mix the urea solution with the exhaust gas.

FIG. 13 shows graphs representative of the pressure drop caused by the mixing devices A, B, C, and D at different exhaust flow rate. Mixing devices C and D that employs the mixing device 60 of the present disclosure may tend to cause less pressure drop than the prior art mixing devices A and B at all exhaust flow rates.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A selective catalytic reduction (SCR) system comprising:
   an exhaust pipe for receiving exhaust gas from an engine, wherein the exhaust pipe defining a longitudinal axis parallel to a flow of the exhaust gas;
   an SCR catalyst provided downstream of the exhaust pipe; and
   a device for mixing a dosing agent injected by the SCR system and the exhaust gas,
   wherein
      the device including (i) a first plate disposed longitudinally within the exhaust pipe and (ii) a second plate disposed longitudinally within the exhaust pipe and spaced downstream from the first plate,
      an upstream end of the second plate is spaced apart from a downstream end of the first plate with respect to the longitudinal axis,
      the first plate or the second plate extends through a center of a first cross-sectional area of the exhaust pipe, and
      the first cross-sectional area is in a first plane extending laterally across the exhaust pipe and perpendicular to the longitudinal axis.

2. The SCR system of claim 1, wherein the first plate is arranged at a first positive angle with respect to parallel to the longitudinal axis, and wherein the second plate is arranged at a second negative angle with respect to parallel to the longitudinal axis, wherein magnitudes of the first and second angles are each less than 90 degrees.

3. The SCR system of claim 2, wherein the first and second angles are each less than or equal to a predetermined angle from parallel to the longitudinal axis and providing for a predetermined pressure drop across the device.

4. The SCR system of claim 3, wherein the predetermined angle is 10 degrees from parallel to the longitudinal axis.

5. The SCR system of claim 1, wherein:
   the first plate extends through the center of the first cross-sectional area of the exhaust pipe;
   the second plate extends through a center of a second cross-sectional area of the exhaust pipe;
   the second cross-sectional area is in a second plane extending laterally across the exhaust pipe and perpendicular to the longitudinal axis; and
   the second plane is different than the first plane.

6. The SCR system of claim 1, wherein:
   the first plate extends through the center of the first cross-sectional area of the exhaust pipe;
   a center of the first plate is not in the center of the first cross-sectional area, such that the center of the first plate is shifted within the exhaust pipe and laterally away from a centerline of the exhaust pipe; and
   the centerline extends longitudinally along the exhaust pipe and through a center point of the first cross-sectional area of the exhaust pipe.

7. A selective catalytic reduction (SCR) system comprising:
   an exhaust pipe for receiving exhaust gas from an engine, wherein the exhaust pipe defining a longitudinal axis parallel to a flow of the exhaust gas;
   an SCR catalyst provided downstream of the exhaust pipe; and
   a device for mixing a dosing agent injected by the SCR system and the exhaust gas,
   wherein
      the device including (i) a first plate disposed longitudinally within the exhaust pipe and (ii) a second plate disposed longitudinally within the exhaust pipe and spaced downstream from the first plate,
      an upstream end of the second plate is spaced apart from a downstream end of the first plate with respect to the longitudinal axis,
      the first plate and the second plate extend through a centerline of the exhaust pipe, and
      the centerline extends longitudinally along the exhaust pipe and through a point at a center of a cross-sectional area of the exhaust pipe.

8. A selective catalytic reduction (SCR) system comprising:
   an exhaust pipe for receiving an exhaust gas from an engine, wherein the exhaust pipe defining a longitudinal axis parallel to a flow of the exhaust gas;
   an SCR catalyst provided downstream of the exhaust pipe; and
   a device for mixing a dosing agent injected by the SCR system,
   wherein
      the device includes a first plate disposed longitudinally within the exhaust pipe and is arranged at less than or equal to a predetermined angle from parallel to the longitudinal axis,
      the predetermined angle provides for a predetermined pressure drop across the device,
      the first plate includes a plurality of openings and a plurality of tabs,
      the plurality of tabs are connected to and extend outward from a side of the first plate,
      the plurality of openings and the plurality of tabs collectively form a grid pattern, and
      a total number of tabs included on the first plate is less than a total number of openings in the first plate, such that some of the plurality of openings do not have a corresponding one of the plurality of tabs.

9. The SCR system of claim 8, wherein:
   the plurality of tabs extend (i) longitudinally at a first angle relative to the first plate, and (ii) laterally at a second angle relative to the first plate; and
   the first angle and the second angle are less than 90° relative to the first plate.

10. The SCR system of claim 9, further comprising a second plate disposed longitudinally within the exhaust pipe and spaced downstream from the first plate,
   wherein an upstream end of the second plate is spaced apart from a downstream end of the first plate with respect to the longitudinal axis.

* * * * *